(12) United States Patent
Murakami et al.

(10) Patent No.: US 11,004,285 B2
(45) Date of Patent: May 11, 2021

(54) PROCESSING DEVICE, PROCESSING METHOD, AND PROGRAM

(71) Applicant: TOYOTA JIDOSHA KABUSHIKI KAISHA, Toyota (JP)

(72) Inventors: Kunihiro Murakami, Okazaki (JP); Katsuhiko Sakakibara, Kariya (JP); Makoto Matsushita, Ichinomiya (JP); Junya Sato, Nagoya (JP); Kiyonori Yoshida, Toyota (JP); Tae Sugimura, Miyoshi (JP); Takashi Hayashi, Aichi-gun (JP); Jun Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/740,543

(22) Filed: Jan. 13, 2020

(65) Prior Publication Data

US 2020/0258336 A1    Aug. 13, 2020

(30) Foreign Application Priority Data

Feb. 8, 2019    (JP) .............................. JP2019-021633

(51) Int. Cl.
*G07C 9/25* (2020.01)
*G06K 9/00* (2006.01)
*G06K 9/78* (2006.01)
*G06Q 50/30* (2012.01)
*E05F 15/70* (2015.01)

(52) U.S. Cl.
CPC ......... *G07C 9/257* (2020.01); *G06K 9/00255* (2013.01); *G06K 9/00288* (2013.01); *G06K 9/78* (2013.01); *G06Q 50/30* (2013.01); *E05F 15/70* (2015.01)

(58) Field of Classification Search
None
See application file for complete search history.

(56) References Cited

U.S. PATENT DOCUMENTS

| 2006/0055512 | A1* | 3/2006 | Chew | G06K 9/00885 340/5.82 |
| 2015/0073703 | A1* | 3/2015 | Jouaux | G01S 5/0278 701/465 |
| 2015/0232064 | A1* | 8/2015 | Cudak | B60R 25/31 701/23 |
| 2017/0046800 | A1* | 2/2017 | Zomet | G06Q 50/12 |
| 2018/0032997 | A1* | 2/2018 | Gordon | G06Q 30/0269 |

(Continued)

FOREIGN PATENT DOCUMENTS

JP    2003-271781 A    9/2003

*Primary Examiner* — Carlos Garcia
(74) *Attorney, Agent, or Firm* — Oblon, McClelland, Maier & Neustadt, L.L.P.

(57) ABSTRACT

A processing device includes a control unit configured to perform: identifying a user when the user enters a vehicle and performing a process of guaranteeing a boarded state of the user while the user is in the vehicle; receiving information on a predetermined procedure for performing an authentication process from the user; and transmitting user information which is required for performing the predetermined procedure as information on the user of whom the boarded state in the vehicle is guaranteed to an external device that is installed at a first place for the predetermined procedure in a state in which the boarded state of the user is guaranteed.

8 Claims, 6 Drawing Sheets

(56) References Cited

U.S. PATENT DOCUMENTS

2018/0072265 A1\* 3/2018 Samadani .............. B60K 28/04
2018/0247382 A1\* 8/2018 Taniguchi .............. G06Q 50/30
2018/0374280 A1\* 12/2018 Lasala .................. G06Q 20/322

\* cited by examiner

PROCESSING DEVICE, PROCESSING METHOD, AND PROGRAM

INCORPORATION BY REFERENCE

The disclosure of Japanese Patent Application No. 2019-021633 filed on Feb. 8, 2019 including the specification, drawings and abstract is incorporated herein by reference in its entirety.

BACKGROUND

1. Technical Field

The disclosure relates to a processing device, a processing method, and a program.

2. Description of Related Art

A person may move to a predetermined place and perform a predetermined procedure. For example, in an airport, a person moves to a place for emigration or immigration examination and goes through the examination. For example, when a restaurant is reserved, a user moves to the reserved restaurant and performs a procedure for confirming the reservation at a reception desk of the restaurant. A technique of performing a part of an examination in advance to smoothly perform an immigration examination has been disclosed (for example, Japanese Patent Application Publication No. 2003-271781 (JP 2003-271781 A)).

SUMMARY

The disclosure provides a technique of reducing complication of a procedure when a user moves to a predetermined place and performs a predetermined procedure.

According to a first aspect of the disclosure, there is provided a processing device including a control unit configured to perform: identifying a user when the user enters a vehicle and performing a process of guaranteeing a boarded state of the user while the user is in the vehicle; receiving information on a predetermined procedure for performing an authentication process from the user; and transmitting user information which is required for performing the predetermined procedure as information on the user of whom the boarded state in the vehicle is guaranteed to an external device that is installed at a first place for the predetermined procedure in a state in which the boarded state of the user is guaranteed.

According to a second aspect of the disclosure, there is provided a processing method including: identifying a user when the user enters a vehicle and performing a process of guaranteeing a boarded state of the user while the user is in the vehicle; receiving information on a predetermined procedure for performing an authentication process from the user; and transmitting user information which is required for performing the predetermined procedure as information on the user of whom the boarded state in the vehicle is guaranteed to an external device that is installed at a first place for the predetermined procedure in a state in which the boarded state of the user is guaranteed.

According to a third aspect of the disclosure, there is provided a program causing a computer to perform: identifying a user when the user enters a vehicle and performing a process of guaranteeing a boarded state of the user while the user is in the vehicle; receiving information on a predetermined procedure for performing an authentication process from the user; and transmitting user information which is required for performing the predetermined procedure as information on the user of whom the boarded state in the vehicle is guaranteed to an external device that is installed at a first place for the predetermined procedure in a state in which the boarded state of the user is guaranteed, or a non-transitory computer-readable storage medium storing the program.

According to the disclosure, it is possible to provide a technique of reducing complication of a procedure when a user moves to a predetermined place and performs a predetermined procedure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In a processing device according to a first embodiment of the disclosure, a control unit identifies a user when the user enters a vehicle and performs a process of guaranteeing a boarded state of the user while the user is in the vehicle. Here, guaranteeing means giving reliability to a predetermined procedure.

The control unit receives information on a predetermined procedure for performing an authentication process from the user.

The control unit transmits user information which is required for performing the predetermined procedure as information on the user of whom the boarded state in the vehicle is guaranteed to an external device that is installed at a first place for the predetermined procedure in a state in which the boarded state of the user is guaranteed.

Here, the predetermined procedure includes a procedure associated with a predetermined service which is provided to the user at the first place. In another example, the predetermined procedure includes a procedure associated with a predetermined service which is provided to the user at a second place other than the first place as a target place to which the vehicle transfers the user.

With the above-mentioned processing device, when a vehicle picks up a user and arrives at a first place and user information for performing a predetermined procedure is transmitted as user information indicating that a boarded state of the user is guaranteed to an external device, the predetermined procedure is a safe procedure. The external device can perform at least a part of the predetermined procedure using the user information. Accordingly, the user can complete at least a part of the predetermined procedure in a state in which the user is in the vehicle. That is, the above-mentioned processing device can reduce complication of a procedure.

First Embodiment

System Configuration

Figure 1:
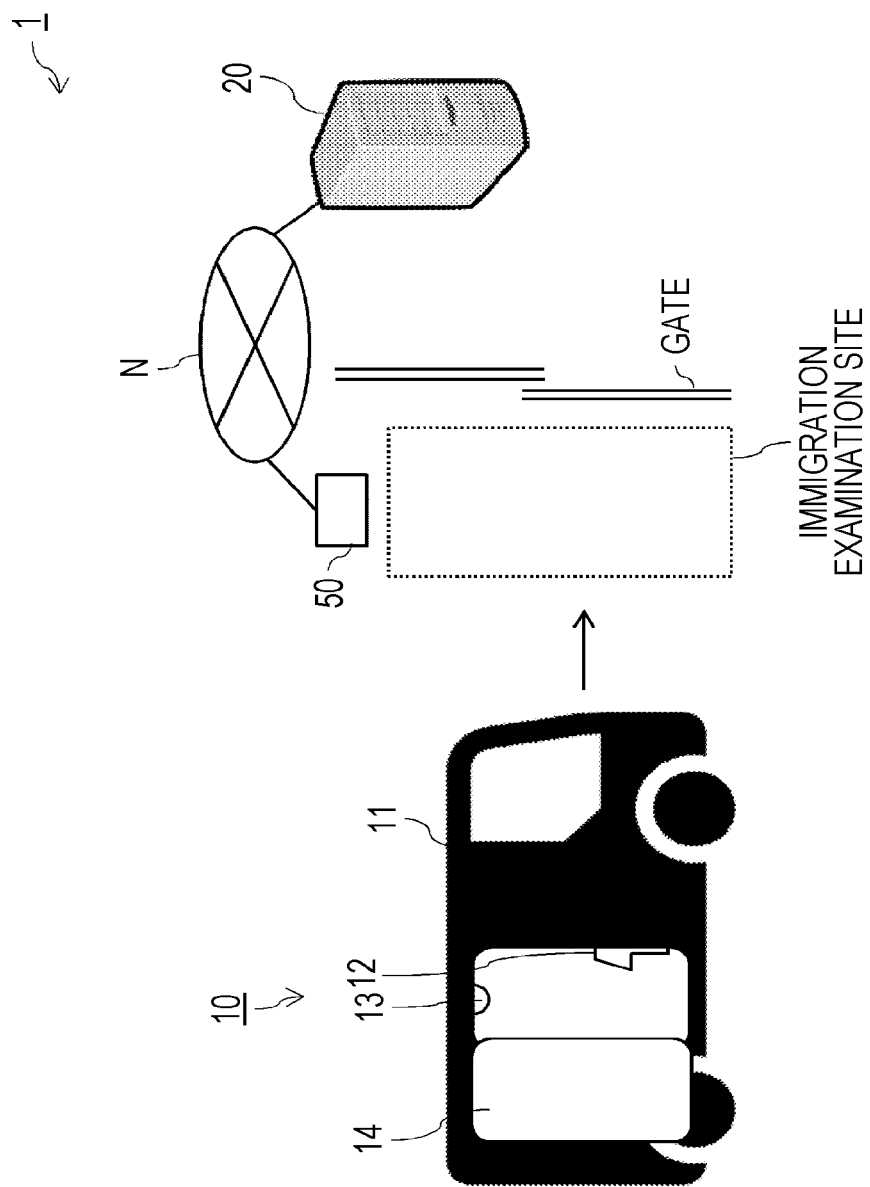
FIG. 1 is a diagram schematically illustrating an example of a configuration of a processing system according to a first embodiment.

FIG. 1 is a diagram schematically illustrating an example of a configuration of a processing system 1 according to a first embodiment. The processing system 1 according to this embodiment includes a processing device 10, an information processing device 20, and a communication device 50. The processing device 10 is provided in a vehicle 11. Here, the vehicle 11 is an electric vehicle and is an unmanned carrier vehicle. For example, the vehicle 11 picks up a user who has exited an airplane that has arrived at an airport and transfers the user to an immigration examination site. Here, the processing device 10 is an example of a "processing device" in the claims.

The processing device 10 includes, for example, a passport scanner 12 and a camera 13. A doorway for entry and exit of passengers is provided in the vehicle 11, and a door 14 is provided in the doorway. The passport scanner 12 is provided in the doorway. The camera 13 is provided in an upper part of the doorway.

The information processing device 20 is a device that provides a predetermined service using user information of a user who is in the vehicle 11. The information processing device 20 performs immigration examination, for example, using passport information of a user who is guaranteed to be in the vehicle 11 and determines whether immigration is permitted or prohibited.

The communication device 50 transmits and receives information to and from the vehicle 11. The communication device 50 is provided, for example, at the immigration examination site. Here, the immigration examination site is an example of a "first place" in the claims. The communication device 50 is an example of an "external device" in the claims.

In the processing system 1 according to the first embodiment, the information processing device 20 and the communication device 50 are connected to each other via a network (N). As the network, for example, a wide area network (WAN) that is a global public communication network such as the Internet, or another communication network may be employed. The network may include a telephone communication network for mobile phones or the like or a wireless communication network such as Wi-Fi (registered trademark).

Functional Configuration

Figure 2:
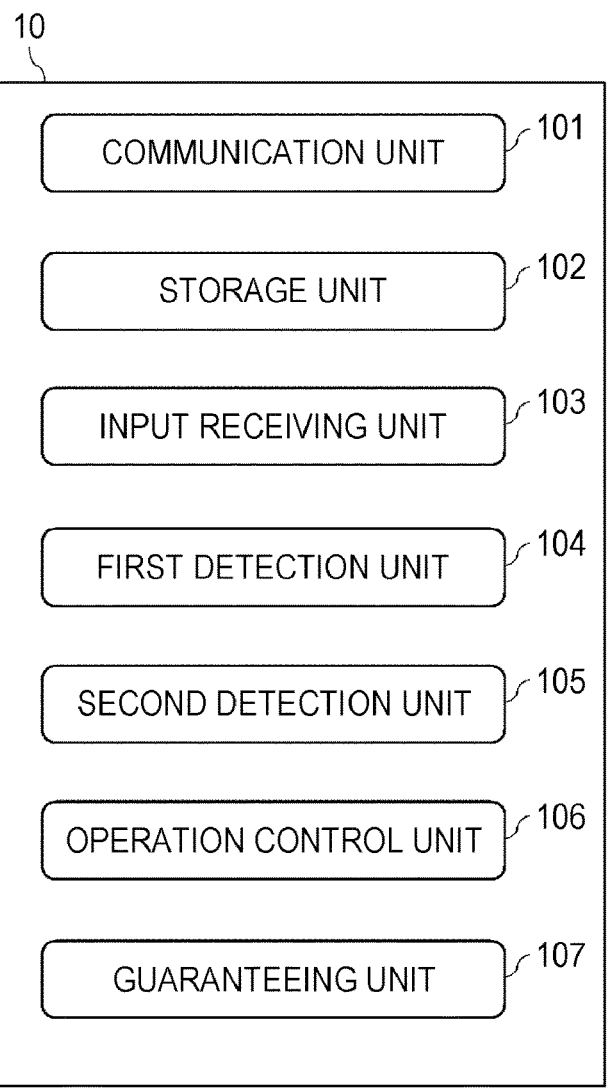
FIG. 2 is a diagram schematically illustrating an example of a functional configuration of a processing device.

FIG. 2 is a diagram schematically illustrating an example of a functional configuration of the processing device 10. The processing device 10 is a computer that includes a processor such as a central processing unit (CPU), a main storage device such as a RAM or a ROM, and an auxiliary storage device such as an EPROM, a hard disk drive, or a removable medium in the body of the passport scanner 12 in addition to the passport scanner 12 and the camera 13. The removable medium may be, for example, a USB memory or a disk recording medium such as a CD or a DVD. An operating system (OS), various programs, various tables, and the like are stored in the auxiliary storage device, and functions which match a predetermined purpose as will be described later may be embodied by loading a program stored in the auxiliary storage device into a work area of the main storage device, executing the loaded program, and controlling constituent units through execution of the program.

The processing device 10 includes a communication unit 101. The communication unit 101 has a function of transmitting and receiving information to and from an external device. The information includes user information and service information. The communication unit 101 transmits and receives the information to and from an external device, for example, via a mobile communication service such as a wireless local area network (LAN), a 3G (3rd Generation), or a Long Term Evolution (LTE).

The processing device 10 includes a storage unit 102. The storage unit 102 includes a main storage device and an auxiliary storage device. The main storage device is a memory in which a control program which is executed by a processor or data which is used in the control program is loaded. The auxiliary storage device is a device in which a control program which is executed by a processor or data which is used in the control program is stored. The auxiliary storage device may store an operating system for executing a program. Various functions are embodied by loading a program stored in the auxiliary storage device into the main storage device and causing the processor to execute the program.

The processing device 10 includes an input receiving unit 103. The input receiving unit 103 receives information included in a passport held up to the passport scanner 12 as input information. Here, the information included in a passport is an example of the user information.

The processing device 10 includes a first detection unit 104. The first detection unit 104 detects opening/closing of the door 14 from an image captured by the camera 13. Detection of opening/closing of the door 14 from an image is realized by an existing identification algorithm.

The processing device 10 includes a second detection unit 105. The second detection unit 105 detects a person who enters or exits the vehicle 11 from an image captured by the camera 13. Detection of a person who enters or exits the vehicle 11 from an image is realized by an existing identification algorithm.

The processing device 10 includes an operation control unit 106. The operation control unit 106 performs control associated with opening/closing of the door 14 of the vehicle 11. The operation control unit 106 moves the vehicle 11 to a predetermined place by performing control associated with driving of the vehicle 11. The predetermined place is, for example, the immigration examination site. When movement to the predetermined place has been completed, the operation control unit 106 sends a signal indicating that the vehicle has arrived at the predetermined place to the communication unit 101.

The processing device 10 includes a guaranteeing unit 107. The guaranteeing unit 107 receives a detection signal indicating opening/closing of the door 14 from the first detection unit 104. The guaranteeing unit 107 also receives a detection signal for a person who enters or exits the vehicle 11 from the second detection unit 105. When a detection signal of a person who enters the vehicle 11 is received from the second detection unit 105, the guaranteeing unit 107 stores information on the person who enters the vehicle 11 in the main storage device or the auxiliary storage device via the storage unit 102. Here, the guaranteeing unit 107 may compare input information of a user received by the input receiving unit 103 with the information on a user who enters the vehicle 11 and who is detected by the second detection unit 105. When a detection signal of a person who exits the vehicle 11 is received from the second detection unit 105, the guaranteeing unit 107 deletes information on the person who exits the vehicle 11 from the main storage device or the auxiliary storage device via the storage unit 102.

Figure 3:
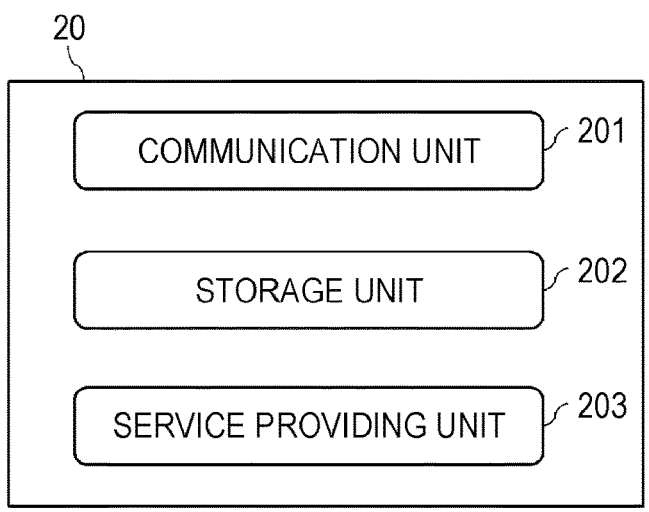
FIG. 3 is a diagram schematically illustrating an example of a functional configuration of an information processing device.

FIG. 3 is a diagram schematically illustrating an example of a functional configuration of the information processing device 20. The information processing device 20 illustrated in FIG. 3 is a computer that includes a processor such as a CPU, a main storage device such as a RAM or a ROM, and an auxiliary storage device such as an EPROM, a hard disk drive, or a removable medium. The removable medium may be, for example, a USB memory or a disk recording medium such as a CD or a DVD. An operating system (OS), various programs, various tables, and the like are stored in the auxiliary storage device, and functions which match a predetermined purpose as will be described later can be embodied by loading a program stored in the auxiliary storage device into a work area of the main storage device, executing the loaded program, and controlling constituent units through execution of the program.

The information processing device 20 includes a communication unit 201. The communication unit 201 has a function of transmitting and receiving information to and from an external device. The received information includes user information. The transmitted information includes service information which is provided. The communication unit 201 transmits and receives the information to and from an external device, for example, via a LAN.

The information processing device 20 includes a storage unit 202. The storage unit 202 includes a main storage device and an auxiliary storage device. The main storage device is a memory in which a control program which is executed by a processor or data which is used in the control program is loaded. The auxiliary storage device is a device in which a control program which is executed by a processor or data which is used in the control program is stored. The auxiliary storage device may store an operating system for executing a program. Various functions are embodied by loading a program stored in the auxiliary storage device into the main storage device and causing the processor to execute the program.

The information processing device 20 includes a service providing unit 203. The service providing unit 203 processes a service for a user based on information received by the input receiving unit 103. Here, the service providing unit 203 performs an immigration examination of a user, for example, based on passport information of the user.

Figure 4:
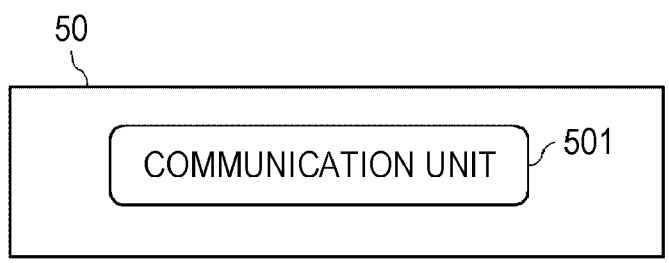
FIG. 4 is a diagram schematically illustrating an example of a functional configuration of a communication device.

FIG. 4 is a diagram schematically illustrating an example of a functional configuration of the communication device 50. The communication device 50 illustrated in FIG. 4 is a computer that includes a processor such as a CPU, a main storage device such as a RAM or a ROM, and an auxiliary storage device such as an EPROM or a hard disk drive. An operating system (OS), various programs, various tables, and the like are stored in the auxiliary storage device, and functions which match a predetermined purpose as will be described later can be embodied by loading a program stored in the auxiliary storage device into a work area of the main storage device, executing the loaded program, and controlling constituent units through execution of the program.

The communication device 50 includes a communication unit 501. The communication unit 501 has a function of transmitting information received from an external device to another external device. Here, the information includes user information and service information.

Process Flow in Processing System 1

Figure 5:
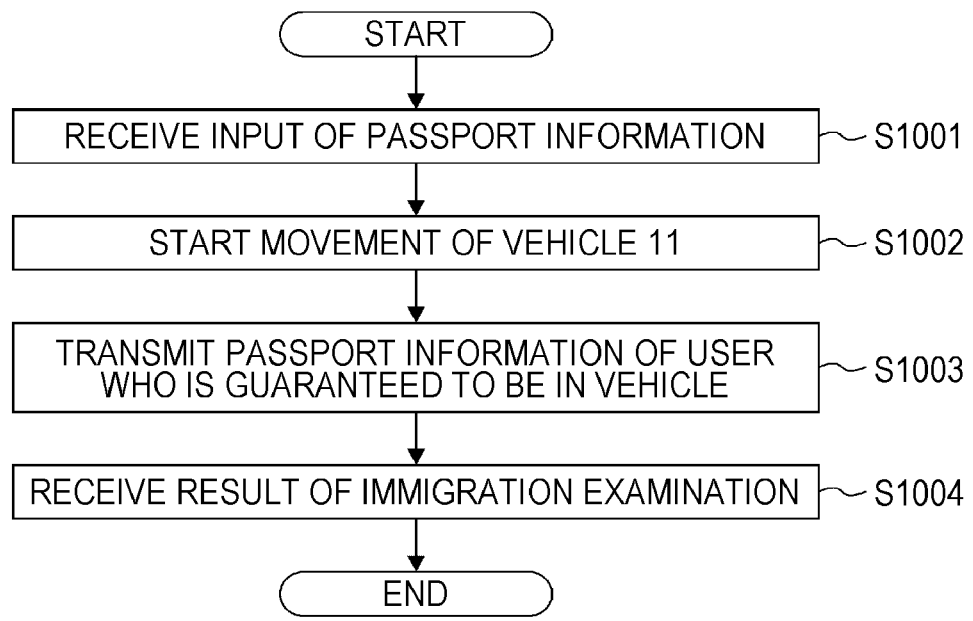
FIG. 5 is a flowchart illustrating a process flow which is performed by the processing device.

A process flow which is performed by the processing device 10 will be described below. FIG. 5 is a flowchart illustrating a process flow which is performed by the processing device 10.

(S1001)

It is assumed that a vehicle 11 waits, for example, in the vicinity of a place at which an aircraft has arrived and the door 14 thereof is open. When a user enters the vehicle 11, the user holds a passport up to the passport scanner 12. In Step S1001, the input receiving unit 103 reads passport information of the user via the passport scanner 12. In Step S1001, the second detection unit 105 detects a user who enters the vehicle 11 from an image captured by the camera 13. Then, when a user who enters the vehicle 11 is detected by the second detection unit 105, the guaranteeing unit 107 stores the passport information of the user read by the input receiving unit 103 in the main storage device or the auxiliary storage device via the storage unit 102. Here, the second detection unit 105 identifies a face of the user who appears in the image captured by the camera 13, and the guaranteeing unit 107 may compare the identified face information with face information of a user included in the passport information of the user received by the input receiving unit 103.

When a user in the vehicle 11 exits the vehicle 11, the user holds a passport up to the passport scanner 12 similarly. The input receiving unit 103 reads passport information of the user via the passport scanner 12. The second detection unit 105 detects the user who exits the vehicle 11 using the camera 13. Then, the guaranteeing unit 107 deletes the read passport information from the main storage device or the auxiliary storage device via the storage unit 102. That is, the guaranteeing unit 107 performs a process of guaranteeing that the user is in the vehicle 11.

(Step S1002)

In Step S1002, the operation control unit 106 generates a control signal for closing the door 14 of the vehicle 11 at a predetermined time. Then, when the door 14 is closed, the first detection unit 104 detects that the door 14 has been closed. Thereafter, the operation control unit 106 generates a control signal associated with driving of the vehicle 11 along a predetermined route and starts movement to the immigration examination site by controlling driving of the vehicle 11. Here, when the door 14 is closed and movement to the immigration examination site is started, passport information of a user stored in the main storage device or the auxiliary storage device is information for guaranteeing that the user is in the vehicle. The number of users who are guaranteed to be in the vehicle may be one or more. When a plurality of users are in the vehicle 11, the second detection unit 105 may cause the camera 13 to continuously image the inside of the vehicle and ascertain positions of the plurality of users in the vehicle.

(Step S1003)

In Step S1003, the communication unit 101 receives a signal indicating that the vehicle has arrived at the immigration examination site from the operation control unit 106. The communication unit 101 transmits passport information of a user who is guaranteed to be in the vehicle to the communication unit 501. The passport information of a user transmitted to the communication unit 501 is additionally transmitted to the communication unit 201.

(Step S1004)

The passport information of a user transmitted to the communication unit 201 is used for immigration examination in the service providing unit 203. Then, it is determined whether immigration of the user is permitted or prohibited. In Step S1004, the communication unit 101 receives a result of immigration examination of the user via the communication unit 501. Here, immigration is an example of "entering a predetermined area" in the claims. Information on permission or prohibition of immigration of a user is an example of "first information" in the claims.

Advantages of First Embodiment

With the processing system 1, when a vehicle 11 picks up a user and arrives at an immigration examination site and user information for performing an immigration examination procedure is transmitted to the information processing device 20, the information processing device 20 performs the immigration examination procedure using the user information. Accordingly, the user can finish the immigration examination while in the vehicle 11. That is, with the processing system 1, it is possible to reduce complication of an immigration examination procedure.

With the processing system 1, when a vehicle 11 arrives at an immigration examination site, the guaranteeing unit 107 guarantees that a user is in the vehicle 11. When identified face information is compared with face information of the user included in passport information of the user by the second detection unit 105, the guaranteeing unit 107 can prevent identity theft of the user. When the second detection unit 105 causes the camera 13 to continuously image the inside of the vehicle and ascertains positions of a plurality of users in the vehicle, it is guaranteed with greater certainty that the users are in the vehicle 11. Since the communication unit 101 transmits passport information to the communication unit 501 when the vehicle follows a predetermined route and arrives at the immigration examination site, it is possible to prevent passport information from being erroneously transmitted to a device other than the communication device 50. That is, it is possible to enhance accuracy of an immigration examination procedure.

Second Embodiment

System Configuration

Figure 6:
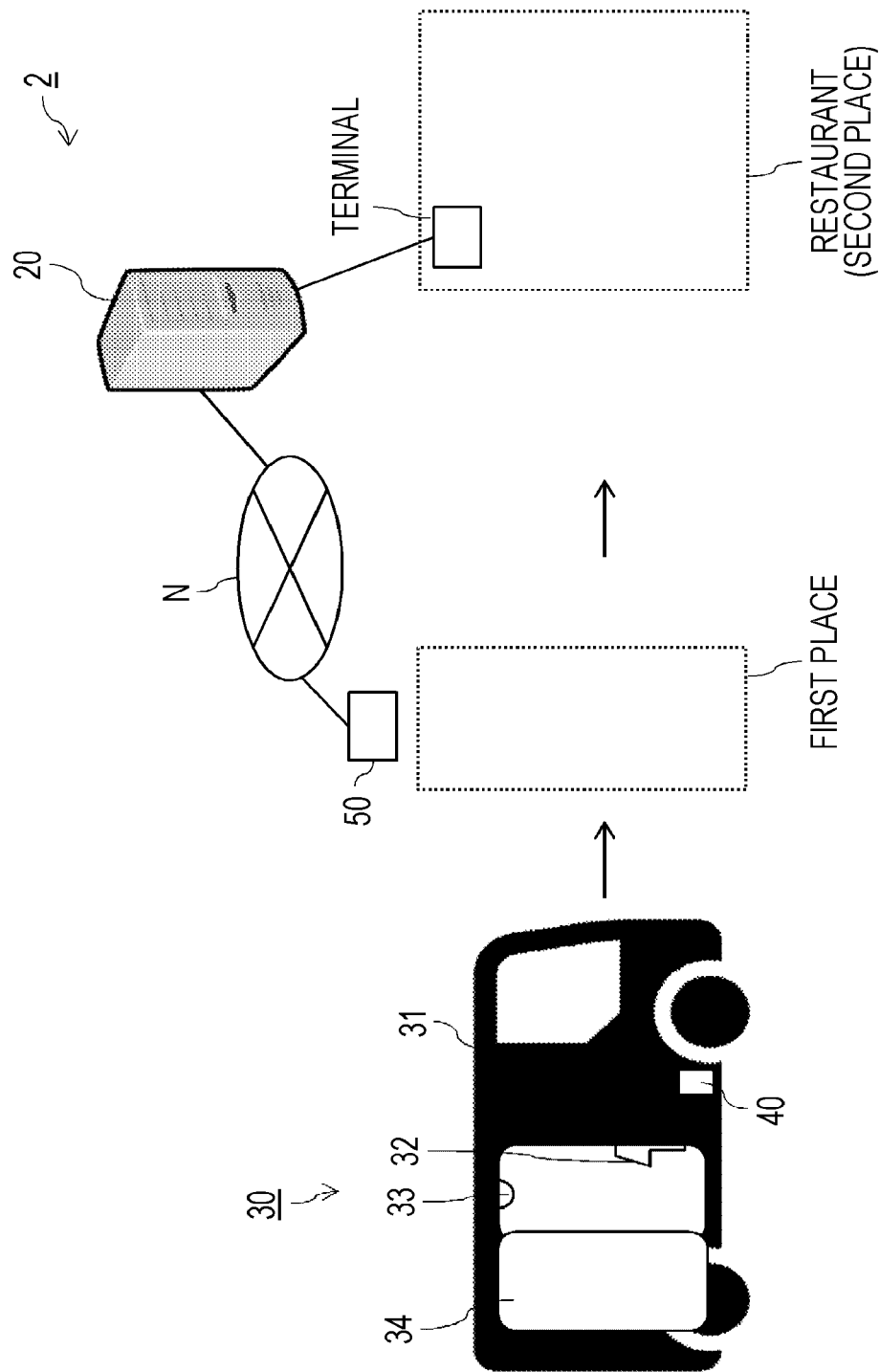
FIG. 6 is a diagram schematically illustrating an example of a configuration of a processing system according to a second embodiment.

FIG. 6 is a diagram schematically illustrating an example of a configuration of a processing system 2 according to a second embodiment. The processing system 2 according to this embodiment includes an information processing device 20, an information terminal 30, a drive device 40, and a communication device 50. Here, a vehicle 31 is an electric vehicle and is an unmanned carrier vehicle. For example, the vehicle 31 transfers a user who has reserved a predetermined restaurant from a predetermined departure place to the restaurant. The information terminal 30 and the drive device 40 are provided in the vehicle 31. Here, the information terminal 30 is an example of a "processing device" in the claims.

The information terminal 30 includes, for example, a touch panel display 32 and a camera 33. A doorway through which a passenger enters or exits the vehicle is provided in the vehicle 31, and a door 34 is provided in the doorway. The touch panel display 32 is provided in the doorway. The camera 33 is provided in an upper part of the doorway.

For example, the information processing device 20 performs a reservation confirmation procedure of a restaurant which is reserved by a user who is in the vehicle 31.

The communication device 50 transmits and receives information to and from the vehicle 31. The communication device 50 is provided at a place other than the restaurant on the way of a route from a current position of the vehicle to the restaurant which is a destination. Here, a place in which the communication device 50 is provided is an example of a "first place" in the claims. The place at which the communication device 50 is installed may be set, for example, based on a traveling speed of the vehicle 31 and a time required for cooking in the restaurant. By setting the place of the communication device 50 in this way, a user may not wait for a time until dishes are completed after the user has arrived at the restaurant. The restaurant is an example of a "second place" in the claims.

The drive device 40 is provided in the vehicle 31 and includes a motor for rotating vehicle wheels of the vehicle 31.

In the processing system 2 according to the second embodiment, the information processing device 20 and the communication device 50 are connected to each other via a network (N). The network may employ, for example, a wide area network (WAN) that is a global public communication network such as the Internet or other communication networks. The network may include a telephone communication network for mobile phones or the like and a wireless communication network such as Wi-Fi (registered trademark).

Functional Configuration

Figure 7:
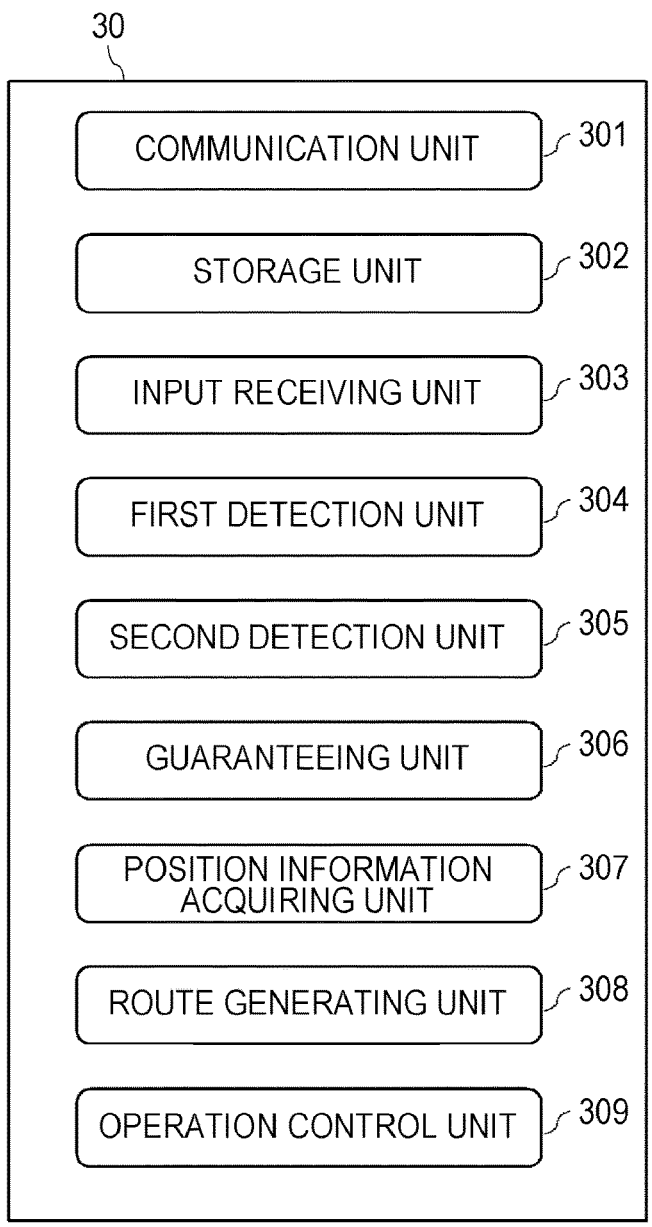
FIG. 7 is a diagram schematically illustrating an example of a functional configuration of an information terminal.

FIG. 7 is a diagram schematically illustrating an example of a functional configuration of the information terminal 30. The information terminal 30 is a computer that includes a processor such as a central processing unit (CPU), a main storage device such as a RAM or a ROM, and an auxiliary storage device such as an EPROM, a hard disk drive, or a removable medium in addition to the touch panel display 32 and the camera 33. The removable medium may be, for example, a USB memory or a disk recording medium such as a CD or a DVD. An operating system (OS), various programs, various tables, and the like are stored in the auxiliary storage device, and functions which match a predetermined purpose as will be described later can be embodied by loading a program stored in the auxiliary storage device into a work area of the main storage device, executing the loaded program, and controlling constituent units through execution of the program. The information terminal 30 includes a GPS module.

The information terminal 30 includes a communication unit 301. The communication unit 301 has a function of transmitting and receiving information to and from an external device. The information includes user information and service information. The information includes cancellation information of a service. The information includes a control signal of the door 34 or an instruction signal on an operation of the drive device 40. The communication unit 301 transmits and receives the information to and from an external device, for example, via a mobile communication service such as a wireless LAN, a 3G (3rd Generation), or a Long Term Evolution (LTE). The communication unit 301 has a function of receiving position information from a position information acquiring unit 307 and comparing the received position information with position information stored in the main storage device or the auxiliary storage device.

The information terminal 30 includes a storage unit 302. The storage unit 302 includes a main storage device and an auxiliary storage device. The main storage device is a memory in which a control program which is executed by a processor or data which is used in the control program is loaded. The auxiliary storage device is a device in which a control program which is executed by a processor or data which is used in the control program is stored. The auxiliary storage device may store an operating system for executing a program. Various functions are embodied by loading a program stored in the auxiliary storage device into the main storage device and causing the processor to execute the program.

The information terminal 30 includes an input receiving unit 303. The input receiving unit 303 receives information on a reserved restaurant which is input by a user via the touch panel display 32. Here, the reservation information of a user is an example of the user information.

The information terminal 30 includes a first detection unit 304. The first detection unit 304 detects opening/closing of the door 34 from an image captured by the camera 33. Detection of opening/closing of the door 34 from an image is embodied by an existing identification algorithm.

The information terminal 30 includes a second detection unit 305. The second detection unit 305 detects a person who enters or exits the vehicle 31 from an image captured by the camera 33. Detection of a person who enters or exits the vehicle 31 from an image is embodied by an existing identification algorithm.

The information terminal 30 includes a guaranteeing unit 306. The guaranteeing unit 306 receives a detection signal indicating opening/closing of the door 34 from the first detection unit 304. The guaranteeing unit 306 also receives a detection signal for a person who enters or exits the vehicle 31 from the second detection unit 305. When a detection signal of a person who enters the vehicle 31 is received from the second detection unit 305, the guaranteeing unit 306 stores information on the person who enters the vehicle 31 in the main storage device or the auxiliary storage device via the storage unit 302. When a detection signal of a person who exits the vehicle 31 is received from the second detection unit 305, the guaranteeing unit 306 deletes information on the person who exits the vehicle 31 from the main storage device or the auxiliary storage device via the storage unit 302.

The information terminal 30 includes a position information acquiring unit 307. The position information acquiring unit 307 has a function of acquiring position information of the information terminal 30. The position information acquiring unit 307 includes, for example, a GPS module and acquires the position information of the information terminal 30 (for example, latitude and longitude). The position information acquiring unit 307 sends the acquired position information to the communication unit 301.

The information terminal 30 includes a route generating unit 308. The route generating unit 308 retrieves and generates a route from a departure place to a destination based on information on the departure place and information of the destination. An existing algorithm is used for retrieval of a route.

The information terminal 30 includes an operation control unit 309. The operation control unit 309 generates a control signal associated with opening/closing of the door 34 of the vehicle 31. The operation control unit 309 generates an instruction signal for operation of the drive device 40 which is provided in the vehicle 31. The instruction is based on the generated route.

Figure 8:
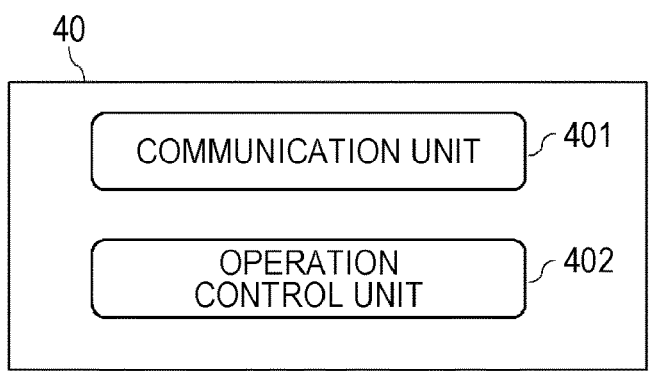
FIG. 8 is a diagram schematically illustrating a functional configuration of a drive device.

FIG. 8 is a diagram schematically illustrating an example of a functional configuration of the drive device 40. The drive device 40 includes a communication unit 401. The communication unit 401 has a function of receiving information from an external device. The information includes a control signal for the door 34 or an instruction signal for operation of the drive device 40. The communication unit 401 transmits or receives the information to and from an external device, for example, via a mobile communication service such as wireless LAN, 3G, or LTE.

The drive device 40 includes an operation control unit 402. The operation control unit 402 performs control associated with opening/closing of the door 34 of the vehicle 31. The operation control unit 402 performs control of a motor based on route information to a destination.

Process Flow of Processing System 2

Figure 9:
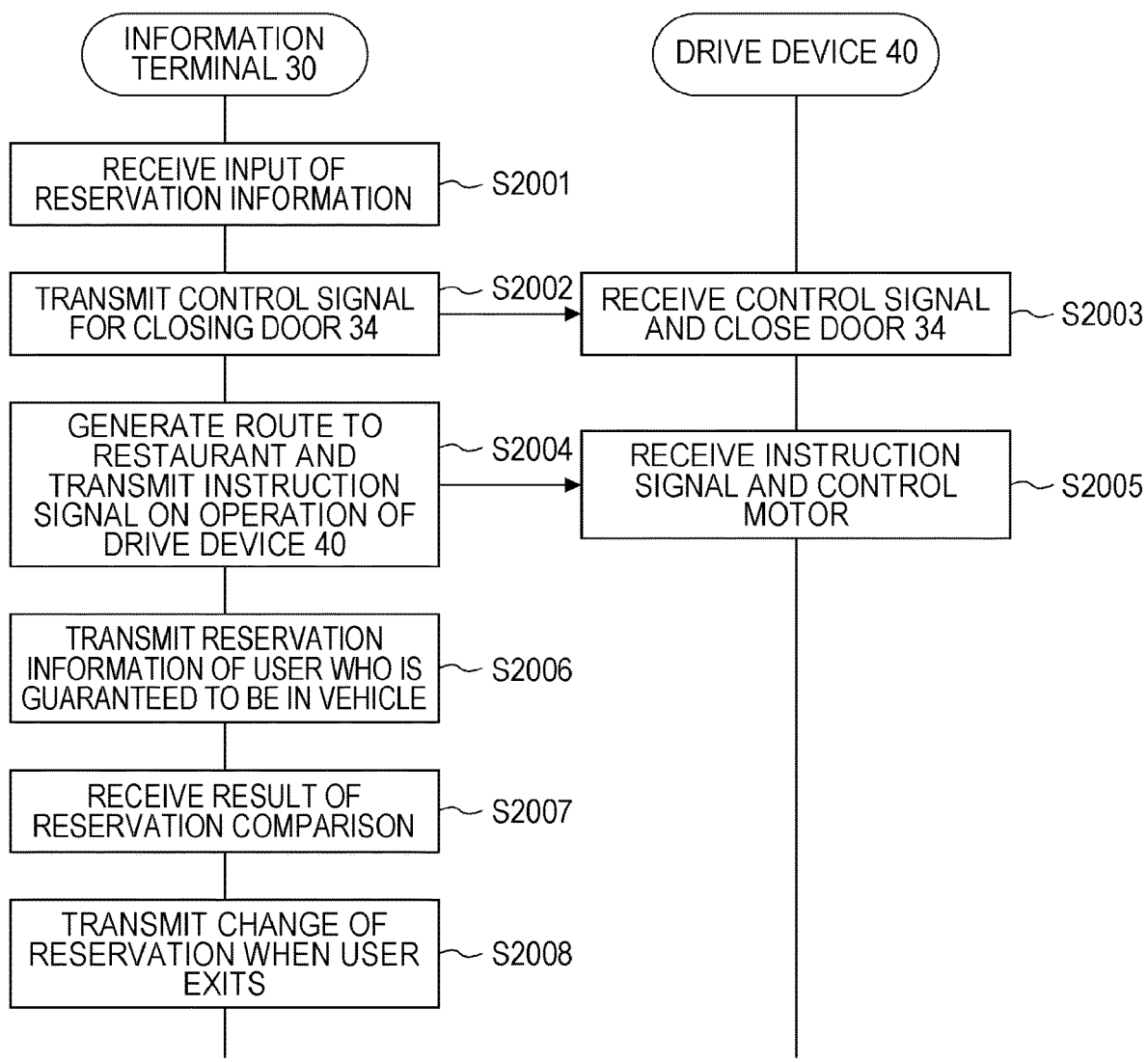
FIG. 9 is a flowchart illustrating a process flow which is performed by the processing system.

A process flow which is performed by the processing system 2 will be described below. FIG. 9 is a flowchart illustrating a process flow which is performed by the processing system 2.

(Step S2001)

It is assumed that the vehicle 31 stops at a predetermined departure place and the door 34 is open. When a user enters the vehicle 31, the user inputs reservation information of a restaurant via the touch panel display 32. In Step S2001, the input receiving unit 303 reads reservation information of the user via the touch panel display 32. In Step S2001, the second detection unit 305 detects a face of the user who enters the vehicle 31 from an image captured by the camera 33. When a user who enters the vehicle 31 has been detected by the second detection unit 305, the guaranteeing unit 306 stores the reservation information of the user read by the input receiving unit 303 and image information of the face of the user in the main storage device or the auxiliary storage device via the storage unit 302.

When a user in the vehicle 31 exits the vehicle 31, the second detection unit 305 detects a face of a user who exits the vehicle 31 using the camera 33. Then, the guaranteeing unit 306 deletes an image of the detected face and reservation information of the user associated therewith from the main storage device or the auxiliary storage device via the storage unit 302. Here, the second detection unit 305 may periodically image the inside of the vehicle 31 using the camera 33 and identify a face of a user who appears in the captured image. The guaranteeing unit 306 may perform comparison of face information of the user who appears in the captured image with face information of the user which was identified in the past and ascertain whether face information of a user stored in the main storage device or the auxiliary storage device matches the face information of the user who enters the vehicle. That is, the guaranteeing unit 306 performs a process of guaranteeing that the user is surely in the vehicle 31.

(Step S2002)

In Step S2002, the operation control unit 309 generates a control signal for closing the door 34 of the vehicle 31. Then, the communication unit 301 sends the generated control signal to the drive device 40.

(Step S2003)

In Step S2003, the communication unit 401 receives the control signal for closing the door 34. Then, the operation control unit 402 performs control of closing the door 34 based on the control signal.

(Step S2004)

In Step S2004, the first detection unit 304 detects that the door 34 is closed. Then, the route generating unit 308 generates a route from the current place to the position of the restaurant. Here, it is assumed that position information of the restaurant is stored in the auxiliary storage device in advance. Here, the current place of the vehicle 31 is acquired by the position information acquiring unit 307. Then, the operation control unit 309 generates an instruction signal for operation of the drive device 40 based on the generated route information. Then, the communication unit 301 transmits the generated instruction signal to the drive device 40.
(Step S2005)

In Step S2005, the communication unit 401 receives the instruction signal. Then, the operation control unit 402 controls a motor such that the vehicle 31 moves along the route included in the received instruction signal. That is, the vehicle 31 starts movement to the restaurant. Here, when the door 34 is closed and movement to the restaurant is started, the reservation information of the user stored in the main storage device or the auxiliary storage device is information for guaranteeing that the user is in the vehicle.
(Step S2006)

In Step S2006, the communication unit 301 acquires the position of the vehicle 31 via the position information acquiring unit 307. When it is ascertained that the vehicle 31 arrives at the vicinity of a first place which is other than the restaurant, the communication unit 301 transmits reservation information of the user who is guaranteed to be in the vehicle and which is stored in the main storage device or the auxiliary storage device to the communication unit 501. Here, it is assumed that information of the first place is stored in the main storage device or the auxiliary storage device in advance and the communication unit 301 compares the acquired position of the vehicle 31 with the information of the first place.
(Step S2007)

In Step S2007, the reservation information transmitted to the communication unit 501 is additionally transmitted to the communication unit 201 of the information processing device 20. The service providing unit 203 compares the reservation information with the stored reservation information and ascertains whether the reservation is valid. Then, the service providing unit 203 ascertains whether the user can visit the restaurant as reserved. Here, ascertaining of whether the user can visit the restaurant as reserved is an example of processing a service for the user. Then, the communication unit 101 receives information indicating that the user can visit the restaurant as reserved from the communication unit 201 via the communication unit 501. Here, when the reservation is valid, it is an example of "a predetermined service is able to be provided" in the claims. Receiving information indicating that the user can visit the restaurant as reserved is an example of "receiving second information" in the claims. The result of comparison of the reservation information is also transmitted to a terminal which is provided in the restaurant.
(Step S2008)

In Step 2008, when the second detection unit 305 detects that a user exits the vehicle 31 before the vehicle arrives at the restaurant after the reservation information of the user has been transmitted to the communication device 50, the communication unit 301 transmits information indicating change of reservation to the communication unit 201. Then, the change of reservation is performed by the service providing unit 203. Here, the change of reservation may be change of a part of reservation such as change of a reservation time. The change of reservation may be cancellation of reservation. The change of reservation is an example of a "request for change of a part of a predetermined service" in the claims. The cancellation of reservation is an example of a "request for change of all a predetermined service" in the claims.

Advantageous Effects of Second Embodiment

With the processing system 2, when the vehicle 31 passes through the vicinity of the first place, the guaranteeing unit 306 guarantees that a user is in the vehicle 31. When the vehicle 31 picks up a user and passes through the vicinity of a place in which the communication device 50 is provided, reservation information of the user is transmitted to the information processing device 20. The information processing device 20 performs a procedure of comparison of the reservation information of the user. Accordingly, a user can finish the reservation comparison procedure in a state in which the user is in the vehicle 31. That is, with the processing system 2, it is possible to reduce complication of a reservation comparison procedure which is performed when the vehicle arrives at the restaurant. When information indicating ascertainment of reservation is transmitted to a terminal provided in the restaurant and cooking is started, the time until cooking is completed after the user has arrived at the restaurant is saved. That is, the restaurant can provide a comfortable service to the user. The restaurant can ascertain visiting of the user in advance and can also perform a procedure of changing or cancelling reservation. That is, the restaurant can easily perform management of seats or the like.

With the processing system 2, when the camera 33 images the inside of the vehicle 31 and the guaranteeing unit 306 compares face information of a user who appears in the captured image with face information of the user which has been captured and ascertains that the face information of the user stored in the main storage device or the auxiliary storage device matches the face information of the user in the vehicle, it is surely guaranteed that the user is in the vehicle 31. When the position of the vehicle 31 is acquired by the position information acquiring unit 307 and it is ascertained that the vehicle 31 is close to the first place, the communication unit 301 transmits reservation information of the user to the communication unit 501. Accordingly, it is possible to prevent the communication unit 301 from erroneously transmitting the reservation information to a device other than the communication device 50. That is, it is possible to improve accuracy of a reservation comparison procedure.

Other Embodiments

In the first embodiment, the process flow which is performed by the processing system 1 when an immigration examination procedure in an airport is performed has been described, but the processing system 1 may be used to perform an emigration examination procedure at an airport. When emigration of a user is granted, a service which is provided by a lounge of an airport may be provided in the vehicle 11.

The first place is not limited to a place in which emigration or immigration examination is performed in an airport or a place in which the communication device 50 is provided. The first place may be, for example, a predetermined government office in a place in which a plurality of government offices are gathered, or the vehicle 11 may circulate in a plurality of government offices. At least a part of a procedure in a government office may be performed in the vehicle 11.

In the second embodiment, the second place may be, for example, a hotel and the processing system 2 may be used for check-in in the hotel.

The second place may be a building which is occupied by a company which is to be visited, and at least a part of an interview procedure in the company which is to be visited may be performed while the vehicle 31 is moving to the building.

The above-mentioned embodiments are only an example and the disclosure can be appropriately modified without departing from the gist of the disclosure.

The configurations or processes which have been described above in the present disclosure can be freely combined for implementation as long as no technical contradictions arise.

A process which has been described to be performed by a single device may be distributed to and performed by a plurality of devices. Alternatively, processes which have been described to be performed by different devices may be performed by a single device. In a computer system, by what hardware configuration (server configuration) each function is to be embodied can be flexibly changed.

The disclosure can also be embodied by supplying a computer program having the functions described mounted therein in the above-mentioned embodiment to a computer and causing one or more processors of the computer to read and execute the computer program. Such a computer program may be provided to the computer via a non-transitory computer-readable storage medium which can access a system bus of the computer or may be provided to the computer via a network. Examples of the non-transitory computer-readable storage medium include an arbitrary type of disk such as a magnetic disk (such as a Floppy (registered trademark) disk or a hard disk drive (HDD)) or an optical disc (such as a CD-ROM, a DVD disc, or a blue-ray disc) and an arbitrary type of medium which is suitable for storing electronic commands such as a read only memory (ROM), a random access memory (RAM), an EPROM, an EEPROM, a magnetic card, a flash memory, or an optical card.

What is claimed is:

1. A processing device comprising a controller configured to:
    identify a user when the user enters a vehicle and performing a process of guaranteeing a boarded state of the user while the user is in the vehicle;
    receive information on a predetermined procedure for performing an authentication process from the user; and
    transmit, when the vehicle arrives at a first place, user information which is required for performing the predetermined procedure as information on the user of whom the boarded state in the vehicle is guaranteed to an external device that is installed at the first place for the predetermined procedure in a state in which the boarded state of the user is guaranteed.

2. The processing device according to claim 1, wherein the predetermined procedure is a procedure associated with a predetermined service which is provided to the user at the first place, and
    wherein the controller is configured to further perform receiving first information as the predetermined service from the external device after the user information has been transmitted to the external device.

3. The processing device according to claim 2, wherein the vehicle allows a user, who undergoes an examination for permission of entry into a predetermined area as the predetermined service, to board the vehicle,
    wherein the predetermined procedure is a procedure for the examination which is undergone by the user at an examination site which is the first place, and
    wherein the controller is configured to transmit the user information on the user to the external device for the examination at the examination site and to receive the first information on a result of the examination of the user from the external device in a state in which the boarded state of the user is guaranteed.

4. The processing device according to claim 1, wherein the predetermined procedure is a procedure associated with a predetermined service which is provided to a user at a second place other than the first place as a target place to which the vehicle transfers the user, and
    wherein the controller is configured to receive second information indicating that the predetermined service is able to be provided at the second place from the external device after the user information has been transmitted to the external device.

5. The processing device according to claim 4, wherein the controller is configured to transmit a request for change of a part or all of the predetermined service to the external device when the user exits the vehicle before the vehicle arrives at the second place after the user information has been transmitted to the external device.

6. The processing device according to claim 1, wherein the predetermined procedure is a passport control procedure.

7. A processing method comprising:
    identifying, with a controller, a user when the user enters a vehicle and performing a process of guaranteeing a boarded state of the user while the user is in the vehicle;
    receiving, by the controller, information on a predetermined procedure for performing an authentication process from the user; and
    transmitting, by the controller and when the vehicle arrives at a first place, user information which is required for performing the predetermined procedure as information on the user of whom the boarded state in the vehicle is guaranteed to an external device that is installed at the first place for the predetermined procedure in a state in which the boarded state of the user is guaranteed.

8. A non-transitory computer-readable medium encoded with computer-readable instructions that, when executed by a computer, cause the computer to perform a method comprising:
    identifying a user when the user enters a vehicle and performing a process of guaranteeing a boarded state of the user while the user is in the vehicle;
    receiving information on a predetermined procedure for performing an authentication process from the user; and
    transmitting, when the vehicle arrives at a first place, user information which is required for performing the predetermined procedure as information on the user of whom the boarded state in the vehicle is guaranteed to an external device that is installed at the first place for the predetermined procedure in a state in which the boarded state of the user is guaranteed.

* * * * *